United States Patent [19]

van Elten

[11] Patent Number: 4,915,566
[45] Date of Patent: Apr. 10, 1990

[54] INSTALLATION FOR COLLECTING CRATES

[75] Inventor: Elbertus J. van Elten, St. Ann, Mo.

[73] Assignee: Elten Nederland B.V., Barneveld, Netherlands

[21] Appl. No.: 67,462

[22] PCT Filed: Oct. 6, 1986

[86] PCT No.: PCT/NL86/00034
§ 371 Date: Jul. 31, 1987
§ 102(e) Date: Jul. 31, 1987

[87] PCT Pub. No.: WO87/02016
PCT Pub. Date: Apr. 9, 1987

[30] Foreign Application Priority Data

Oct. 4, 1985 [NL] Netherlands .......................... 8502715

[51] Int. Cl.⁴ ................................................ B65G 1/16
[52] U.S. Cl. ..................... 414/276; 198/562;
193/35 A; 414/746.4; 414/278; 414/286; 414/268
[58] Field of Search ............... 414/266, 267, 268, 276, 414/286, 278, 746.4, 745.9; 193/35 R, 35 A; 198/525, 526, 528, 537, 540, 546, 562, 563

[56] References Cited

U.S. PATENT DOCUMENTS

| | | | |
|---|---|---|---|
| 2,405,141 | 8/1946 | Hibbard | 414/748 X |
| 2,751,781 | 6/1956 | McConnell | 414/748 X |
| 3,239,054 | 3/1966 | Eliassen | 198/562 X |
| 3,610,445 | 10/1971 | Kitchen et al. | 414/276 |
| 3,674,159 | 7/1972 | Lemelson | 414/276 |
| 3,805,974 | 4/1974 | Andersson et al. | 414/276 |

FOREIGN PATENT DOCUMENTS

| | | | |
|---|---|---|---|
| 96505 | 12/1983 | European Pat. Off. | 414/276 |
| 1059835 | 6/1959 | Fed. Rep. of Germany | 193/35 A |
| 1456709 | 1/1970 | Fed. Rep. of Germany | 193/35 A |
| 2407756 | 8/1975 | Fed. Rep. of Germany | |

Primary Examiner—Frank E. Werner
Attorney, Agent, or Firm—Ladas & Parry

[57] ABSTRACT

A system for the order collection of boxes, cases, crates and containers having gravity roller tracks arranged in adjacent rows, provided with a crate supplier along the high feed-in side and an order discharge track along the low discharge side. According to the invention, the boxes, cases, crates and containers are transferred by a transfer device from the lower end of a gravity roller track either onto an order discharge conveyor extending along the lower discharge side or over this discharge track onto a short storage track aligned with the gravity roller conveyor.

6 Claims, 8 Drawing Sheets

INSTALLATION FOR COLLECTING CRATES

The invention relates to an installation for automatically collecting homogenous crates to comprise orders, combined with collecting single articles by hand.

For automatically collecting orders, consisting of cases, boxes or crates, sometimes inclined gravity roller tracks arranged in adjacent rows are used, see patent application No. NL 84 00320. At the higher feed-in side the crates are supplied over a supply conveyor from a stores room as required and automatically pushed onto the roller track in question by pushers, in such a manner that on each roller track those boxes or crates are arranged in a row containing only one type of article.

As a rule, however, non-automatic storage systems are used, in which the crates are supplied on pallets by fork lift trucks, and then preferably they have to be received all at once by one roller track.

In both the automatic and the non-automatic system the crates coming down the slope are stopped by a stop at the lower end of each gravity roller track.

An order is collected by transferring a number of crates or boxes from the lower ends of the various roller tracks to the order-collecting conveyor running along these ends.

In the more automated systems, each roller track is often provided with a transfer mechanism at its downward end. The transfer can either be established by mechanically removing the stop temporarily or by lifting the crate abutting the stop over the stop, in both cases with the result that the crate or box rolls on and ends up on the order collecting-conveyor.

Also known are transfer means, being movable along the downward end which transfer one or more crates from one particular roller track onto the collecting conveyor and then pass on to the next destined roller track for the transfer of more crates.

In automatic installations, a computer orders and checks from which roller track how many crates have to be transferred for a certain order, on the basis of a computer-stored order file.

It often occurs that certain orders have to be supplemented by single articles, which then have to be removed by hand from a box or crate and transferred into another crate. So far, preferably, a similar type of system of adjacent gravity roller tracks was used, which tracks can be also automatically loaded in automatic installations from a supply conveyor provided with one or more pushers, which push the arriving crates from the supply conveyor onto the gravity roller track in question, after which the crates roll on up to the stop at the downward end of the roller track or up to the preceding crate.

The first crate is within easy reach, so that articles can be removed by hand and, in combination with other articles, transferred to one or more crates.

So far the two systems, i.e. the system for automatically collecting complete crates and the systems for collecting single articles by hand, were regarded as two separate systems. So the two systems were each separately supplemented with crates via the pertaining supply conveyors with pushers, either or not computer-controlled and -checked.

In either system the length of the gravity roller tracks has to be preferably such that they can receive more than the number of crates stored on one complete pallet, which implies that the roller tracks have to be of considerable length.

Apart from the fact that these long roller tracks and the dual supply system are expensive, there is the considerable disadvantage, in view of the usual lack of space in the order collection rooms, of occupying nearly twice as much space, whereas the requirements for supplementing the roller tracks are not properly attuned, imposing an extra burden on the supply from the storage room.

The present invention relates to a combined installation, from which both complete crates can be automatically collected and single articles can be collected by hand, requiring, however, only one supply system having one joint supply conveyor with pushers and only one set of inclined supply tracks, yielding a tremendous economy in space and expenses.

This combined installation comprises a first part, for automatically collecting complete crates according to the usual construction as described above, in which the required crates can be transferred from the downward end of each roller track either onto the collecting conveyor for the collecting of complete crates to compose an order, or past the collecting conveyor onto a short storage track extending in line with the gravity roller track and destined for only single crates from which the single articles can be collected by hand.

It depends on the costs involved which method is used for transferring the crates from the gravity roller track onto either the collecting conveyor or the short storage track.

If only a small number of gravity roller tracks is required then it is advantageous to provide the lower end of each track with a transfer means. If due to a great variety of articles many gravity roller tracks are required, then it is advantageous to use a movable transfer means, which is moved along the lower ends of the tracks and transfers the required crates in succession.

The embodiment of a movable transfer means is shown in FIG. 5, whereas FIG. 8, 8b and 8c show its cross-section with the transfer means in three different positions.

Figure 1:
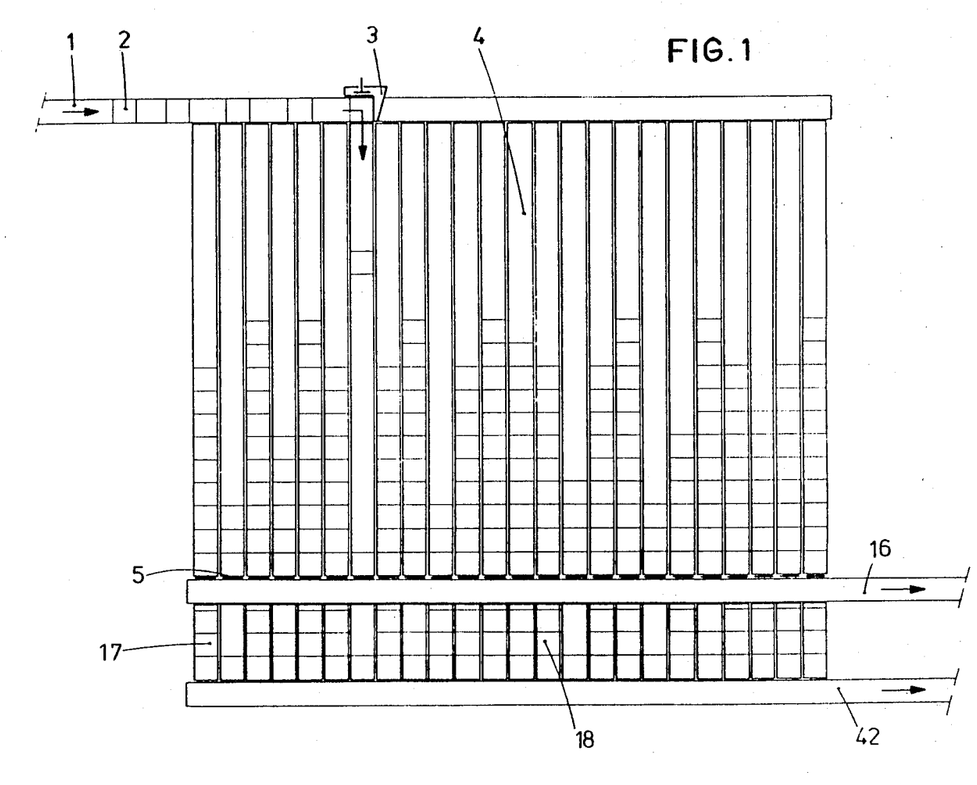
FIG. 1 shows a combined installation according to the invention in the embodiment which has a separate transfer means for each gravity roller track.

The operation of the device according to FIG. 1 is as follows: The crates or boxes (2) are supplied by the supply conveyor (1) from an automatic installation, a pallet destacking machine or from a manual destacking location, said crates or boxes being pushed by one or more loaders or pushers (3) onto the destined gravity roller track (4) in such a manner that on each gravity roller track (4) only one type of article is arranged. The pushed crates come down the slope of the gravity roller track (4) and are stopped by the stop (5) at the end of the track or by the preceding crate.

Figure 2:
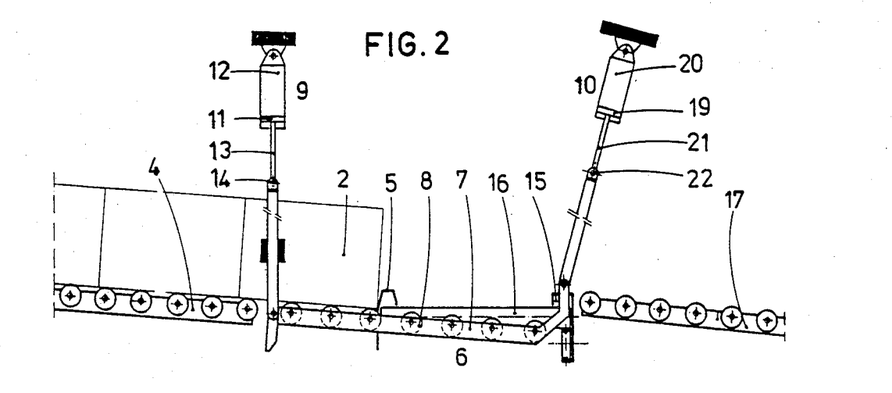
FIGS. 2, 2a and 2b show a cross-section of the crate transfer means in one embodiment at a somewhat larger scale.

According to FIG. 2, the lower end of each roller track (4) is provided with a transfer means (6) consisting of a vertically movable frame (7) comprising freely rotating rollers (8) and lifting devices (9) and (10).

Figure 2A:
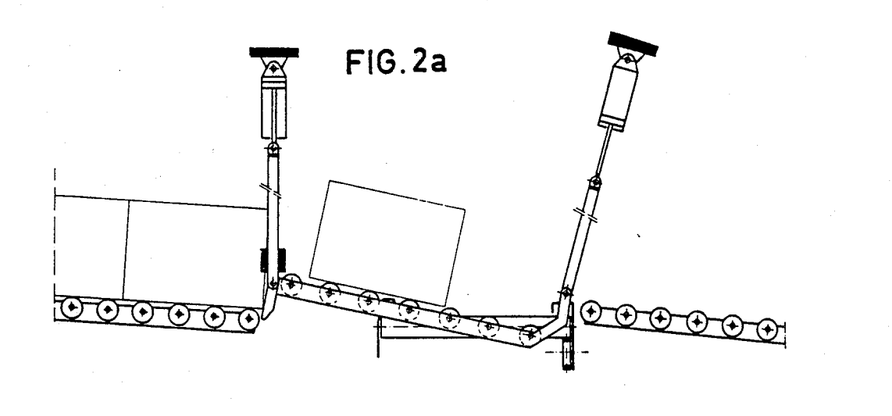

In order to collect homogenous crates destined for an order, this frame (7) is moved upwardly on the side of the roller tracks (4) by the piston (11) in cylinder (12) via the pulling rod (13) and the forked end (14) to the position as drawn in FIG. 2a, by which the crate (2) is lifted over the fixed stop (5) and rolls on to the equally fixed stop (15) so that during the downward motion of the pulling rod (13), the crate is deposited onto the ordercollecting conveyor (16), which discharges the collected crates (2) in transverse direction.

According to the invention, said frame (7) with rollers (8) is also used to transfer a crate, box or case from the roller track (4) to the short storage track arranged in line with the track (4), which is e.g. a sliding chute or roller track (17) for the hand order picking (18). In order to achieve this, according to FIG. 2, the other end of the frame (7) can be vertically moved by piston (19) in cylinder (20) (via pulling rod (21) and forked end (22)).

Figure 2B:
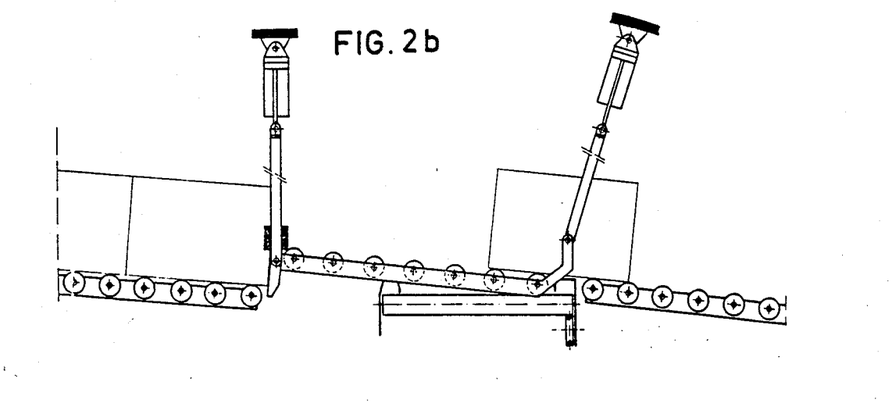

Simultaneously with the lifting device (9), the lifting device (10) is also energized, so that both ends of the frame (7) are lifted up to the drawn position according to FIG. 2b, which causes the crate (2) to also roll past stop (15) onto the storage track (17).

Figure 3:
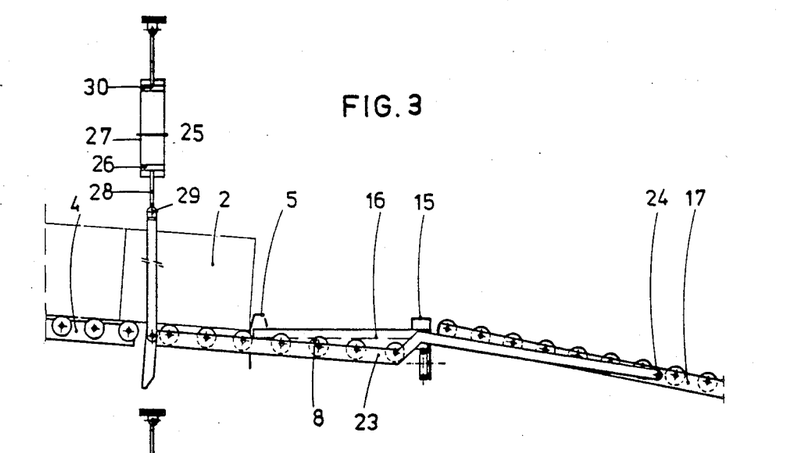
FIGS. 3, 3a, and 3b and FIGS. 4, 4a and 4b show the same in two other embodiments.

The crate transfer means according to FIG. 3 has a frame (23) which on one side is pivotable about the shaft (24) and on the other side is vertically movable by means of a lifting device (25) with three positions.

Figure 3A:
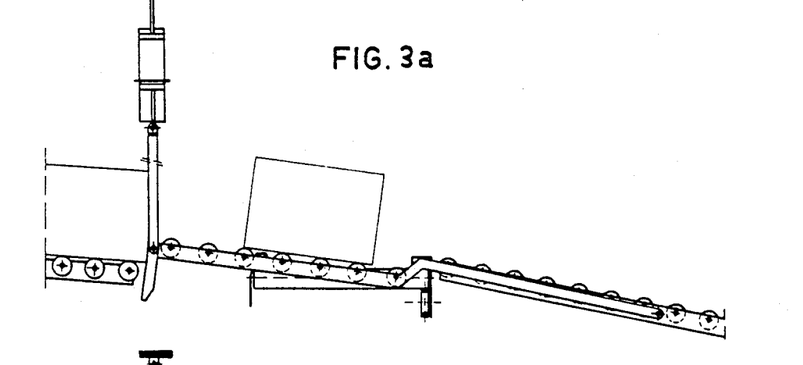

In order to transfer a crate (2) onto the order-collecting track (16), the piston (26) in cylinder (27) is energized on one side so that the frame (23), via the pulling rod (28) and the forked end (29), is lifted up to the middle position drawn in FIG. 3a.

Figure 3B:
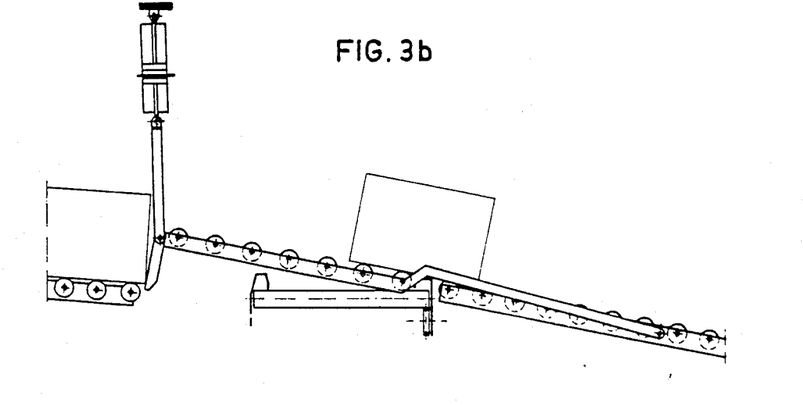

Then the crate (2) continues to roll over the stop (5) and is stopped by the stop (15), so that at the next downward movement of the piston (26) the crate (2) is deposited onto the order-collecting conveyor (16) by which it is transversely discharged. If it is required that a crate (2) is transferred onto the storage track (17), then piston (30) is also energized, so that frame (23) is moved to the top position according to FIG. 3b. Then crate (2) runs over the stop (15) and ends up on the storage track (17).

Figure 4:
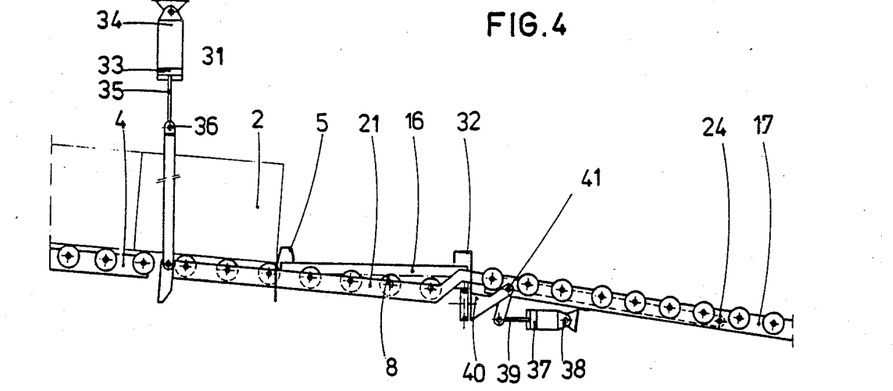

A third method of transferring a crate either onto the collecting track (16) or onto the storage track (17) is shown in FIG. 4. In this embodiment frame (21) is pivotable about shaft (24). A lifting device (21) is secured to the other end of frame (23). Furthermore a removable stop (32) has been provided.

Figure 4A:
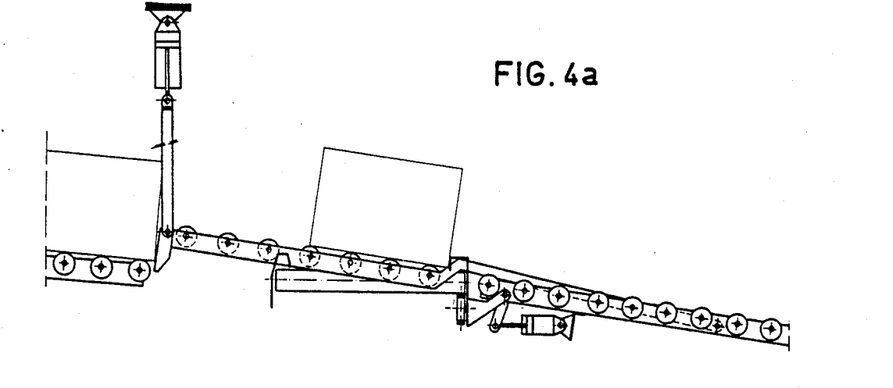

In order to transfer a crate (2) from the roller track (4) onto the order-collecting track (16), the piston (33) in cylinder (34) is energized, so that via piston rod (35) and forked end (36) the frame is lifted to the position as shown in FIG. 4a, which causes the crate (2) to roll on past the stop (5) and to be stopped by movable stop (32),so that during the downward motion of the piston rod (35) the crate is deposited onto the order-collecting track (16).

Figure 4B:
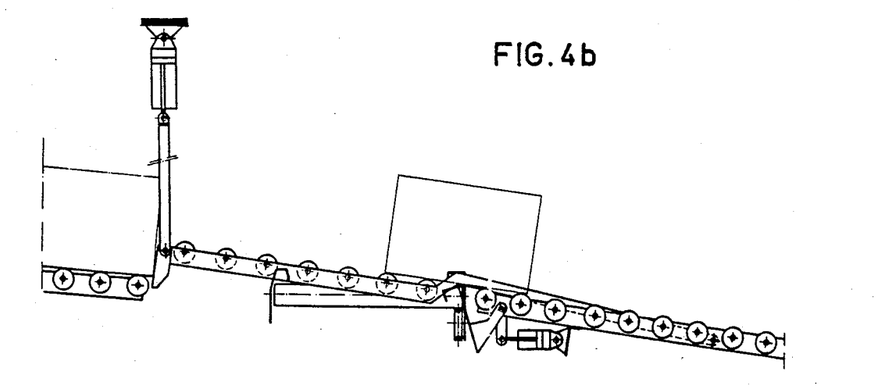
Figure 5:
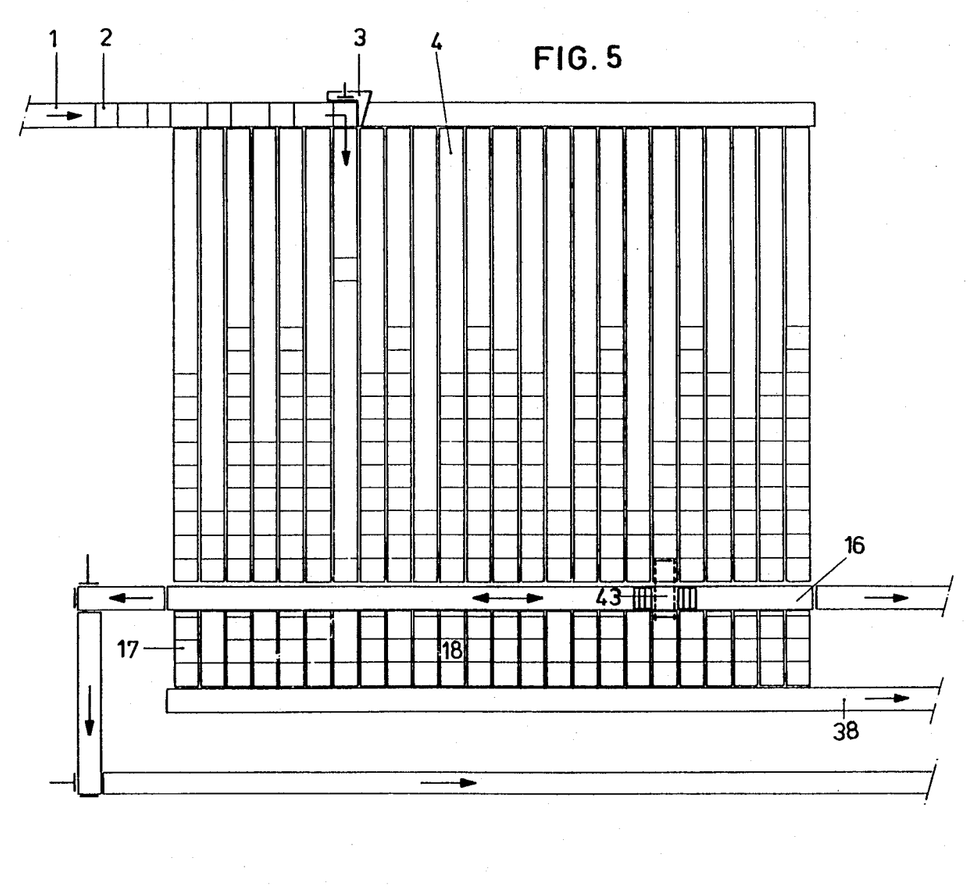

If a crate (2) has to be transferred from the roller track (4) onto the storage track (17), then the piston (37) in cylinder (38) is also energized, simultaneously with the lifting motion of the piston rod (35), so that the piston rod (39) through a lever (40) causes the stop (32) to rotate about shaft (41) up to the position as shown in FIG. 4b. As a result the crate (2) runs past the stop (32) onto the storage track (17).

Articles are collected by hand from the crates arranged on the storage tracks (17) and transferred to another crate, placed on the discharge track (42) shown in FIG. 1.

After the required articles have been transferred to this crate (or these crates), the discharge track (42) transports this crate (or these crates) further, so that they can be added to the row of homogenous crates that are discharged by the collecting track (16).

Figure 6:
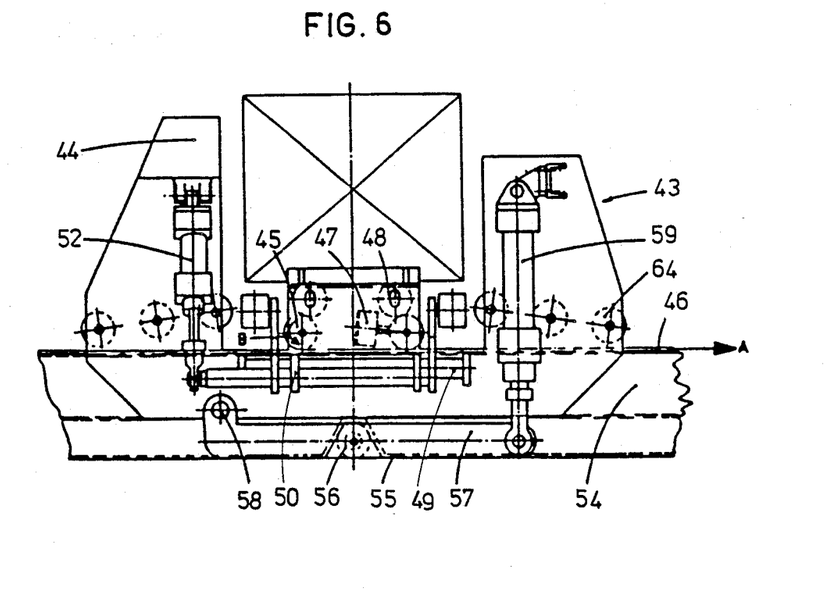
FIG. 6 and 7 show a front view and a top view respectively of the movable transfer means.
Figure 7:
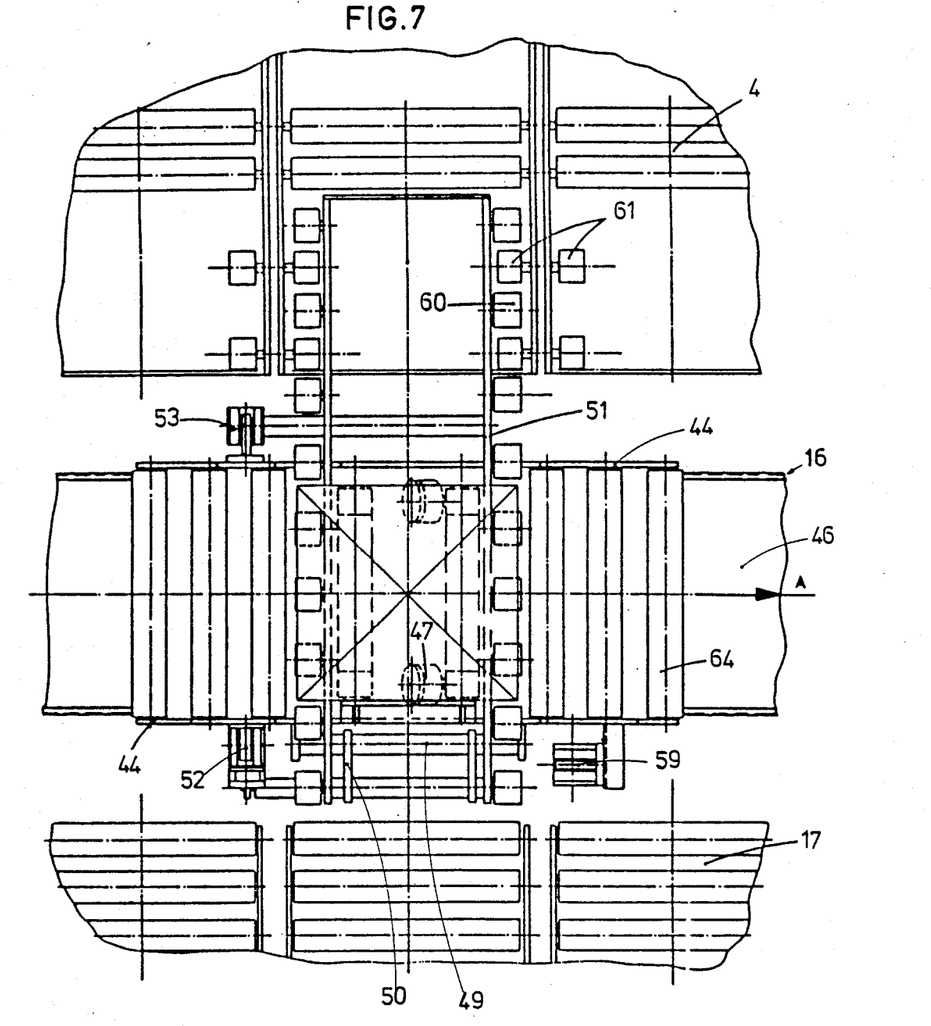
Figure 8:
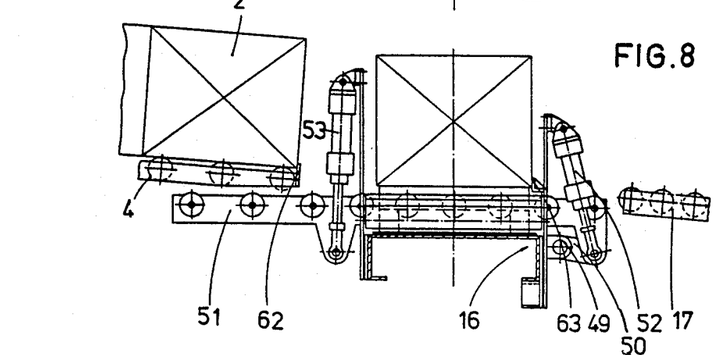
Figure 8A:
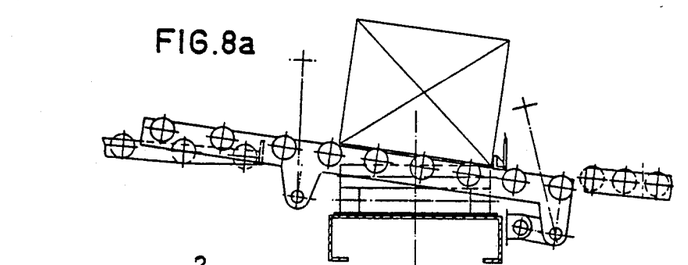

The movable transfer means (43) according to FIG. 6, 7 and 8 is constructed of two frame plates (44) between which rollers (45) are mounted on bearings. These rollers (45) transfer the weight of the transfer means (43) onto the conveyor belt of the belt conveyor (16).

The rollers (45) can be blocked against rotation by a braking device (47). Above the rollers (45) rollers (48) have been disposed, the outer periphery of which is supported by the periphery of the rollers (45).

The pivoting shaft (49) about which lever (50) can pivot, is fixedly connected to frame (44), so that the end of the removable frame (51) on the side of the storage track (17) can be vertically displaced with the aid of the lifting device (52). The other end of the removable frame (51) can be vertically displaced by the lifting device (53). For both the lifting devices (52) and (53) cylinders with pistons have been shown as a possible embodiment.

Fixedly secured to the frame (54) of the conveyor (16) at the location of each gravity roller track (4) a recess (55) has been applied, into which a roller (56) can engage. This roller (56) is connected to a lever (57) being pivotable about a pivoting shaft (58) fixedly secured to frame (44). A fixed connection between the frame (44) and the frame (54) is established, if lifting device (59) pushes the roller (56) through lever (57) into the recess (55), preventing the transfer means (43) from being conveyed by the conveyor belt (46). At the same time braking device (47) is uncoupled so that the conveyor belt (46) can be pulled along under the rollers (45), causing them to start rotating in the direction of the arrow and the rollers (48) resting on them to start counterrotating. If the roller (56) is again moved out of the recess (55) by the lifting device (59), then, almost simultaneously, the braking device (47) is re-energized, blocking the rollers (45) against rotation and conveying the transfer means (43) further by the conveyor belt (46).

The removable frame (51) comprises two rows of freely rotating rollers (60), having been positioned in such a manner that the rollers (60) can pass through between the rollers (61) of the roller track (4) at the end of the frame (51), in its highest position.

In the case that a crate has to be transferred from a gravity roller track onto the conveyor belt (16) only lifting device (53) is energized, causing the removable frame (51) to pivot upwardly about shaft (49) and the first crate (2) on the roller track (4) to be lifted above the stop (62). The crate (2) will then roll down the slope over the rollers (60) and be stopped against the upright wall (63). The next time the removable frame (51) pivots downwardly the crate is deposited onto rollers (48).

On account of the weight of the crate (2) on the rollers (48) it is driven by the rollers (45), so that the crate is displaced laterally in the direction in which the conveyor belt (46) runs and ends up on this conveyor belt via the inclined roller track (64) and is taken along.

In a next upward motion of the removable frame (51) a next crate can be received from the roller track (45) in question. If this is not required but a crate has to be transferred from a next roller track (4), then the removable frame (51) remains in the bottom position, the roller (56) is pulled out of the recess (55) and the rollers (45) are blocked by the braking device (47). The transfer means (43) the moves along with the conveyor belt (46) until the roller track (4) in question has been reached, after which the transfer means (43) is stopped by the engagement of roller (56) and the uncoupling of the braking device (47).

Figure 8B:
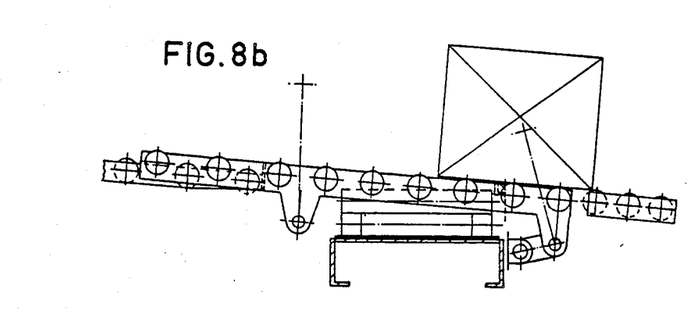

If a crate has to be transferred from the roller track (4) onto a track (17) of the hand flow rack (18) then both the lifting devices (52) and (53) are energized, on account of which the removable frame (51) moves to the position drawn in FIG. 8b and the removed crate rolls over the rollers (60) and the upright rim (63) onto the track (17) of the flow rack (18).

For the collection of an order it is preferable to start at the very beginning of the row of rollers tracks (4). The removed crates then precede the transfer means which is heading for the next roller track (4).

Having arrived the end of the row, that part of the order has been collected, after which the conveyor belt (46) changes its running direction, after which the crates for the next order can be removed during the return motion of the transfer means (43).

The crates collected for an order are available alternately on either side of the conveyor belt (16). In this way one order and the next are clearly separated, facilitating further action very much.

The advantages of the combined installation according to the invention are:

1. A second flow rack and a second installation for loading the storage tracks are not required, thus yielding a tremendous economy in space and in expenses for fork lift trucks, steps and conveyor provisions.

2. Due to the short distance between the end of the roller track (4) and the storage track (17) for the hand order picking (18), the time for replenishing the crates arranged on the storage track (17) is very short. The number of crates on the hand order picking track (17) can be small, without the danger of having no articles available temporarily.

3. Only one set of roller tracks (4) is loaded via computer-controlled transfer means, with the result that on each roller track only crates containing one type of article are deposited. The storage tracks (17) are replenished from the roller tracks (4), resulting in a considerable economy in computer capacity and control.

I claim:

1. A system for the order collection of containers, comprising:
    a first set of roller tracks arranged in inclined adjacent rows and having an upper input portion and a lower output portion with a stopping means to halt the movement of said containers;
    a supply conveyor, adjacent to said upper input portion, to transfer said containers from a storage area to a position adjacent to said upper input portion;
    at least one movable loader, adjacent to said supply conveyor, having an urging means to contact said containers on said supply conveyor and transfer said conveyors onto said first set of roller tracks;
    a second set of roller tracks arranged in adjacent rows and longitudinally aligned with said first set of roller tracks so that said containers can be transferred from said first set of roller tracks onto said second set of roller tracks, said second set of roller tracks having a first portion and a second portion; and
    a transfer means, movable in a longitudinal recliner direction on a conveyor assembly transversely positioned between said lower output portion and said first portion so as to discharge boxes from said system, having a switchable delivery means engageable with said containers on said lower output portion so as to lift said containers from said lower portion onto said transfer means so that said containers can be transferred to either said conveyor assembly or to said first portion by roller track assemblies on said switchable delivery means.

2. A system according to claim 1, wherein said conveyor assembly comprises a movable belt, having a reversible direction of travel, positioned on a conveyor belt track.

3. A system according to claim 2, wherein a first braking means, on said transfer means and said conveyor track frame, temporarily fixes said transfer means to said conveyor track so that said transfer means can transfer said containers from said first set of roller tracks onto said transfer means while the movement of said belt remains unimpeded.

4. A system according to claim 3, wherein said transfer means comprises:
    a frame formed by a first plate and a second plate connected to one another, said first plate is adjacent to said output portion and said second plate is adjacent to said first portion;
    a stop means on said frame to prevent said containers from moving onto said second set of roller tracks;
    at least one movable transfer roller track aligned with said first and second sets of roller tracks and pivotable about a first shaft fixed to said second plate, said moveable transfer roller track having an input end that can pass through said output portion and an output end adjacent to said first portion, said input end passes through said output portion and lifts said containers off said first set of roller tracks and around said stopping means when a first actuation device, attached to said first plate and said input end, pivots said moveable roller track about said first shaft, said output end is connected to a second actuation device attached to said second plate so that the motion of said second actuation device causes said movable transfer roller track to be moved above said stop means so that containers on said transfer means are transferred to said second set of roller tracks; and
    at least one transfer roller track aligned with said belt and attached to said first and second plates, said transfer roller track transfers said container from said transfer means onto said belt.

5. A system according to claim 4 wherein said switchable delivery means comprises:
    at least one rotatable frame roller, positioned between said first and second plates and parallel to said transfer roller track, rotatable frame roller is engageable with said belt so as to transfer the weight of said transfer means onto said conveyor assembly;
    a second braking means engageable with said rotatable frame roller to prevent the rotation of said rotatable frame roller and cause said transfer means to be moved along said conveyor assembly;
    at least one rotatable switching roller, positioned above said rotatable frame roller between said first and second plates, said rotatable switching roller contacts said rotatable frame roller and is rotatably driven when said containers are to be discharged onto said transfer roller track.

6. A system according to claim 5, wherein said first braking means comprises:
   at least one recess in rails of said conveyor belt track; and
   at least one pivotable lever connected to a second shaft attached to said frame and pivoted by a third actuation device attached to both said frame and said lever, said lever is attached to a brake roller that is movable by said lever to engage said recess and prevent said transfer means from moving along said conveyor assembly.

* * * * *